United States Patent
Morie (10) Patent No.: US 11,272,808 B2
(45) Date of Patent: Mar. 15, 2022

(54) MODULAR OVEN WITH EXTENDABLE ROTISSERIE

(71) Applicant: Titan Rotisseries LLC, Scottsdale, AZ (US)

(72) Inventor: Marko Morie, Phoenix, AZ (US)

( * ) Notice: Subject to any disclaimer, the term of this patent is extended or adjusted under 35 U.S.C. 154(b) by 250 days.

(21) Appl. No.: 16/734,315

(22) Filed: Jan. 4, 2020

(65) Prior Publication Data
US 2020/0214496 A1 Jul. 9, 2020

Related U.S. Application Data

(60) Provisional application No. 62/789,160, filed on Jan. 7, 2019.

(51) Int. Cl.
*A47J 37/06* (2006.01)
*A47J 37/04* (2006.01)
*A47J 37/07* (2006.01)

(52) U.S. Cl.
CPC ......... *A47J 37/041* (2013.01); *A47J 37/0704* (2013.01); *A47J 37/0759* (2013.01)

(58) Field of Classification Search
CPC ........ A47J 37/04; A47J 37/041; A47J 37/049; A47J 37/0623; A47J 37/07; A47J 37/0704; A47J 37/0713; A47J 37/0718; A47J 37/0731; A47J 37/0745; A47J 37/0754; A47J 37/0759; A47J 37/0763; A47J 37/0781; A47J 37/0786
USPC ............. 99/421 R, 421 H, 421 HH, 421 HV, 99/421 M
See application file for complete search history.

(56) References Cited

U.S. PATENT DOCUMENTS

| | | | | |
|---|---|---|---|---|
| 4,112,832 A | * | 9/1978 | Severdia | A47J 37/041 99/421 HH |
| 4,944,282 A | * | 7/1990 | Aguiar | A47J 37/049 99/421 H |
| 5,419,249 A | * | 5/1995 | Papandrea | A47J 37/04 99/421 HH |
| 5,884,554 A | * | 3/1999 | Sprick | A47J 37/0704 99/427 |
| 2006/0191528 A1 | * | 8/2006 | Spangrud | A47J 37/0781 126/275 R |
| 2017/0007071 A1 | * | 1/2017 | Zvi Lavie | A47J 37/0745 |

* cited by examiner

*Primary Examiner* — Hung D Nguyen (57) ABSTRACT

A modular framework for a grill and oven includes surfaces for food preparation, storage bins accessible from above, and cabinet storage accessible laterally. Modular elements of the framework may incorporate receiving sites with locating and restraining features and other attachments complementary to fixtures found on commercially available barbeque grills, such as standardized mounting flanges and gas plumbing. An oven chamber beneath the food preparation surfaces or the grill receiving site may include a rotisserie assembly. Since 36 inches above the ground or a floor is a prevalent standard height for food preparation surfaces, a cooking chamber accessed laterally and situated below such a food preparation surface would require a user to bend, stoop, or kneel to access vessels or a rotisserie spit operating in the chamber. The invention includes a rotisserie frame with an extendable spit so that foods on the spit can be accessed with less bending or stooping.

18 Claims, 7 Drawing Sheets

MODULAR OVEN WITH EXTENDABLE ROTISSERIE

CROSS REFERENCE TO RELATED APPLICATION

This non-provisional utility application claims the benefit of and priority to U.S. Provisional Patent Application 62/789,160 "Modular Oven With Extendable Rotisserie," filed 7 Jan. 2019.

The entire contents of U.S. Provisional Patent Application 62/789,160 "Modular Oven With Extendable Rotisserie," filed 7 Jan. 2019 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to rotisseries which suspend or rotate foods in heated enclosures, and such enclosures designed to house a rotisserie assembly.

BACKGROUND

Rotisserie as a verb is also known as spit-roasting, and is a style of roasting where food is skewered on a spit, which is generally a long rod for holding the food while it is being cooked over a fire, in a fireplace or over a campfire, or roasted in an oven, or otherwise suspended over heating elements or a heat source.

This method is generally used for cooking large chunks of foods such as joints or sides of meat, entire animals, such as boar, pigs, deer, reptiles, or fowl, and it is also suitable for large edible portions of plants such as turnips. Rotation of the spit cooks the meat evenly in its own juices and allows easy access to apply gravy, marinades, or other coatings, and to inspect the food for doneness. Self-basting may also occur when the cooking process exudes juices which then run continuously along the exterior of the food while it is rotating.

BRIEF DESCRIPTION

A modular framework for a grill and oven may include surfaces for food preparation, storage bins accessible from above, and cabinet storage accessible laterally. Modular elements of the framework may incorporate receiving sites with locating and restraining features and other attachments complementary to fixtures found on commercially available barbeque grills, such as standardized mounting flanges and plumbing for propane gas.

An oven chamber beneath the food preparation surfaces or the grill receiving site may include a rotisserie assembly. Since 36 inches above the ground or the floor is a widely prevalent standard height for food preparation surfaces, a cooking chamber accessed laterally and situated below such a food preparation surface would require a user to bend, stoop, or kneel to access vessels or a rotisserie spit operating in the chamber.

A primary objective of the invention is to improve ease of access to a rotisserie spit operating inside the oven chamber. A corollary objective is to insulate the hands of a user operating or moving the rotisserie in the oven from heat residing within the controls, levers or handles of the rotisserie.

Another objective of the invention is to confine and reflect generated heat within the cooking chamber, and prevent heat from dissipating to other portions of the framework where heat is not useful or not desirable.

Since cooking by means of burning fuels creates combustion exhaust and smoke, yet another objective of the invention is to collect smoke and combustion exhaust and vent it from the cooking chamber to allow fresh oxygen-bearing air to enter and sustain the combustion. A corollary objective of the invention is to direct exhaust and smoke away from users and other people in the vicinity of the oven works.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Also, variations exist in the spelling of the word "barbeque," such as "barbecue" and the abbreviation "BBQ," and in this specification these words will be understood to be equivalents in all relevant meanings, connotations, and denotations. The word "module" as used in this specification refers not only to any of a set of standardized parts or independent units that can be used to construct a more complex structure or to complete or complement a geometrically defined volume, but also any one of a set of detachable and exchangeable components having common exterior geometries or mating features. A product is "modular" when there are no unpredictable elements in the design of its parts, especially in its exterior shape and in the predetermined location and features for mating or assembling the product into a larger entity in which all modules fit together and work together. "Modularity" standardizes the way by which components fit and interact together, especially physically and mechanically, but in the context of the invention, also electrically, hydraulically, and pneumatically.

Most barbeque arrangements are fabricated as immovable islands, stands, or carts. Rolling cart barbeques typically have limited food preparation spaces such as fold-out wings or slabs which are often also limited in weight bearing capacity as well. Embodiments within the scope of the invention include barbeque arrangements which comprise permanent or semi-permanent frameworks or cabinetry, but may also include frames or structures mounted on skids or wheels so that they can be repositioned occasionally. Additional optional equipment within the scope of the invention includes refrigerated storage modules. Storage modules may be located beneath a food preparation surface, and alternatively a storage module may be a bin further comprising a lid, or storage module further comprising a drawer, or including both of these features. Also, a storage module may further comprise a refrigerated compartment.

Embodiments within the scope of the invention also may include a recess cut into a portion of a food preparation surface or sunk into the structure or framework of the barbeque stand or island. The shape and depth of the recess is selected to conform to and be complementary to standard barbeque grill units. These units typically include plumbing fixtures for connection to combustible gas for cooking such as propane or natural gas, and may also include a tray, hopper, or gondola for holding charcoal for cooking and heating. Mixed-function grills also exist which combine combustible gas burners and charcoal burners. Some units also interoperate with a modular or bolt-on charcoal burner which may be fitted up to the grill unit so that an upper portion of the charcoal burner communicates with a lower portion of the grill unit. This configuration, especially with adjustable closable air inlets, can be used to throttle incoming air to create incomplete combustion of wood or charcoal fuels. The reducing atmosphere which results creates aromatic smoke for seasoning or curing of foods inside the grill, and can also create glazes on foods and other articles, and inhibit corrosion of metal parts.

A barbeque arrangement in accordance with the invention may also include storage compartments below a food preparation surface, and these compartments may comprise drawers or bins with lids, and may also be refrigerated storage modules. As a module, a refrigerated storage module includes connection sites for power. Some refrigeration systems use propane for power to run an absorption refrigeration cycle and do not need electricity to run.

A barbeque arrangement in accordance with the invention may also include an oven located below a food preparation surface or below a recess adapted to receive a modular grill unit. An oven has a chamber for heating and cooking, and refractory material such as tile or firebrick may be disposed within at least a portion of the oven chamber to economize fuel use or may be arranged to form a concave surface to direct or concentrate heat within a cooking zone in the oven. Where foods are positioned over a burner or a tray adapted to hold burning fuel, refractory material may be deposited below the burner so that downwardly radiated heat from the burner can be reflected back upward and used to heat and cook the food. Refractory materials are often delicate and cancellous in structure, so that basting or sauces applied to the foods, or juices, fats, oils which exude from the food during cooking may drip onto the refractory material beneath and usually permeate into it, and these then char or blacken while the oven is being used. Foreign material absorbed by the refractory can degrade its heat transfer properties and if blackened, degrade the albedo of the refractory and reduce its effectiveness in reflecting rather than absorbing heat. Thus, an embodiment of the invention having refractory material arranged below foods being cooked may include a drip tray interposed beneath the food or the burner and above the refractory.

Because food preparation surfaces are usually fixed at a height 36 inches above the ground or a floor, an oven chamber located below that height will require that a person inserting, extracting, basting or inspecting foods therein must stoop, bend, or kneel to access the food. Some people have limited mobility and flexibility and so these bodily motions are not possible for them or are uncomfortable or undesirable. To ease this problem a rotisserie assembly in accordance with the invention may offer a capability to displace the rotatable spit and its axis of rotation from a location within the oven chamber, where it resides during cooking, to a location outside the oven chamber where the spit and the foods impaled or transfixed upon it can be much more easily inspected and accessed.

Another embodiment of a rotatable spit assembly in accordance with the invention includes one or more detachable rotisserie spits which can be removed to a food preparation surface or another staging area of a more convenient and comfortable working height where foods can be loaded onto and unloaded from the spits.

In other embodiments within the scope of the invention, an oven chamber includes thermal insulation such as a firewall, a ceramic material or gypsum board affixed to at least a portion of the exterior of the oven, where the extents of the oven chamber resides within the structure of the barbeque arrangement. Alternatively, the thermal insulation material may be disposed within the framework and adjacent to the oven as shielding material to prevent oven heat from spreading to other portions of the barbeque structure where heating is unnecessary or undesirable. For example, if a barbeque arrangement includes internal electrical wiring or plumbing for combustible cooking gas, fire hazards can be avoided or mitigated by such thermal material acting as shielding around the oven.

Although embodiments having an oven using electric heating elements reside within the scope of the invention, for ovens using combustion, a barbeque arrangement may also include a chimney with a flue communicating with the oven chamber. Besides offering ornamentality, a chimney and flue prevent smoke from interfering with food preparation activities and from bothering people who may wish to gather nearby but who are sensitive to smoke. The height of the chimney and flue can direct smoke upward and disperse it well above the heads of such sensitive persons. A flue may also induce draft within the oven so that fuels burn hotter, more efficiently, and more completely.

According to another set of embodiments in accordance with the invention, thermal insulation material may be disposed between an oven chamber and a modular barbeque grill, or alternatively between an oven chamber and a food preparation surface. This latter alternative may prevent undesirable heat transfer from an oven to foods on the preparation surface, which could accelerate spoilage, or partially heat or cook foods when it is not desired or expected to do so.

Figure 1:
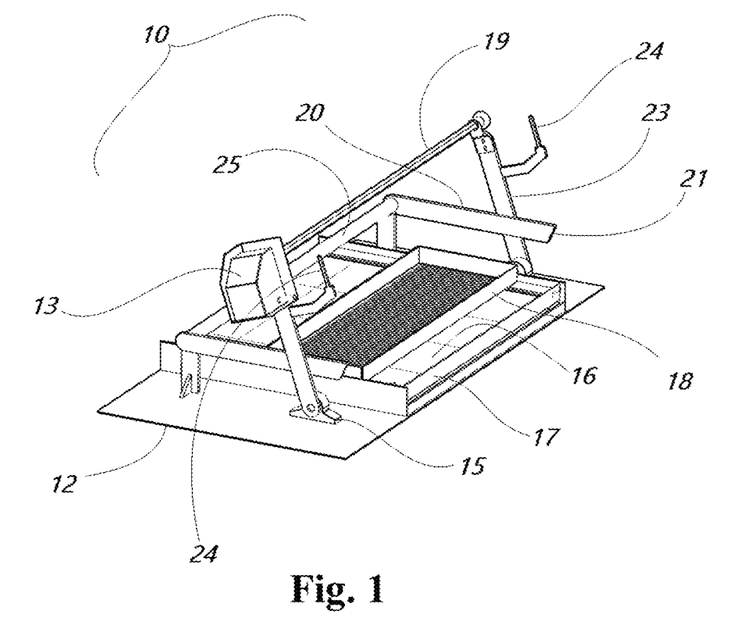
FIG. 1 shows an embodiment of a barbeque rotisserie assembly in accordance with the invention.

FIG. 1 shows an embodiment of a barbeque rotisserie assembly [10] in accordance with the invention which is an extendable rotisserie assembly. The assembly comprises, among other fasteners and hardware, a rotatable spit [19] having first and second ends, which engage into two end frames at each end of the spit. A motor [13] is operably coupled to the spit for rotation of the food impaled on it.

In this embodiment shown, the end frame comprises two slats joined in saltire. Each end frame has a handle [24] which may be attached to or formed as a portion extending from a first slat [23,] and the foot [21] extends from the end of a second slat [20.] The handle as shown may be elaborated upon such as with wrought iron helical coil grips, or turned wooden or porcelain grips which insulate a user's hand from the heat picked up by the metal parts of the assembly. The two frames are connected together by a connecting beam or transverse strut [25] which can be a solid bar or a tube or a structural channel such as an I-beam or C-channel or an angle channel.

The extendable rotisserie is coupled to at least two rotational couplings [15] mounted to a generally planar base [12] and oriented to each other to define an axis for coaxial rotation of the set of end frames. In the embodiment shown the rotational couplings are pillow blocks.

Figure 5:
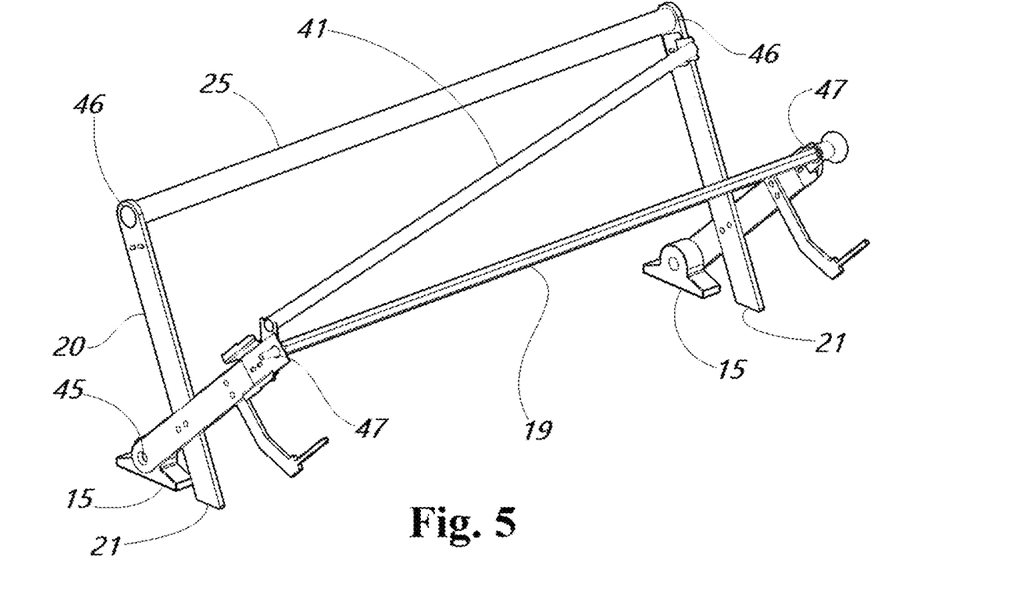
FIG. 5 shows an extendable rotisserie assembly in accordance with the invention and having a diagonal brace.

The attachment points of each end frame to its coupling is a first attachment point [45 in FIG. 5] as recited in the claims, and the connecting beam is a transverse strut extending between and attached to second attachment points [46 in FIG. 5] of both end frames. The spit is rotatably coupled to the third attachment points of both end frames and is also detachable from the end frames. Although not shown, the spit may also include prongs and barbs for holding foods impaled thereupon.

A floor frame [17] retains a number of refractory tiles [16] and as described previously, the embodiment shown in this figure has tiles of refractory material arranged below foods being cooked to reflect heat more evenly onto the food. A drip tray [18] is interposed beneath the food or the burner and above the refractory to collect drippings and prevent foreign matter from contaminating the refractory tiles.

Figure 2A:
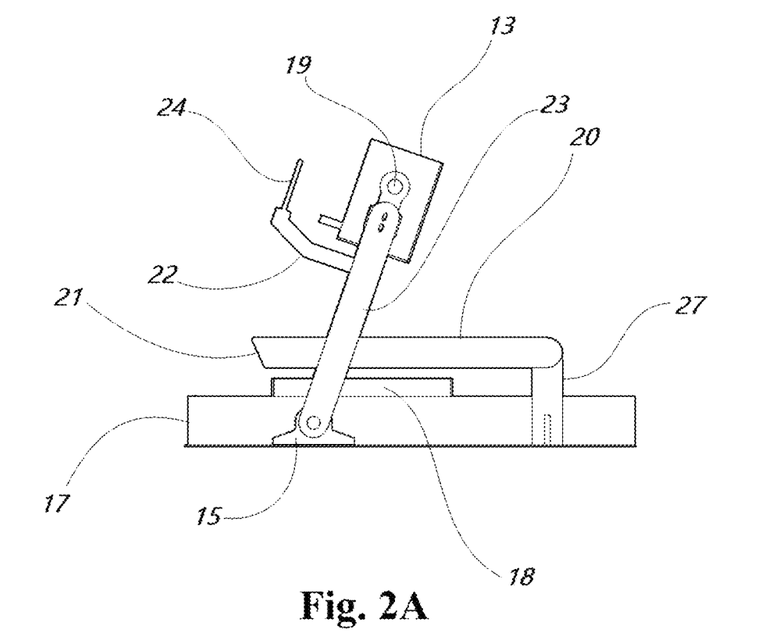
FIG. 2A shows an end view of the embodiment of the barbeque rotisserie assembly seen in FIG. 1 with the rotisserie axis in a retracted position.

FIG. 2A shows an end view of the embodiment of the barbeque rotisserie assembly seen in FIG. 1 with the rotisserie axis in a retracted position. Here are seen the spit [19] in an end-on view, the motor [13,] and the two slats [20, 23] joined in saltire. The first slat [23] has an arm [22] that ends in a handle [24.] The second slat [20] has a foot [21] as its first end and its second end is connected to the transverse beam [25 in FIG. 1] which in this retracted position rests upon a vertical strut [27.] This view also shows the floor frame [17] which holds the refractory tiles and the drip tray [18] which is below the rotisserie axis and above the floor frame. The end frame pivots on an axle which is held in a pillow block [15.] A user may pull or push on the handle to move the rotisserie between a retracted to an extended position.

Figure 2B:
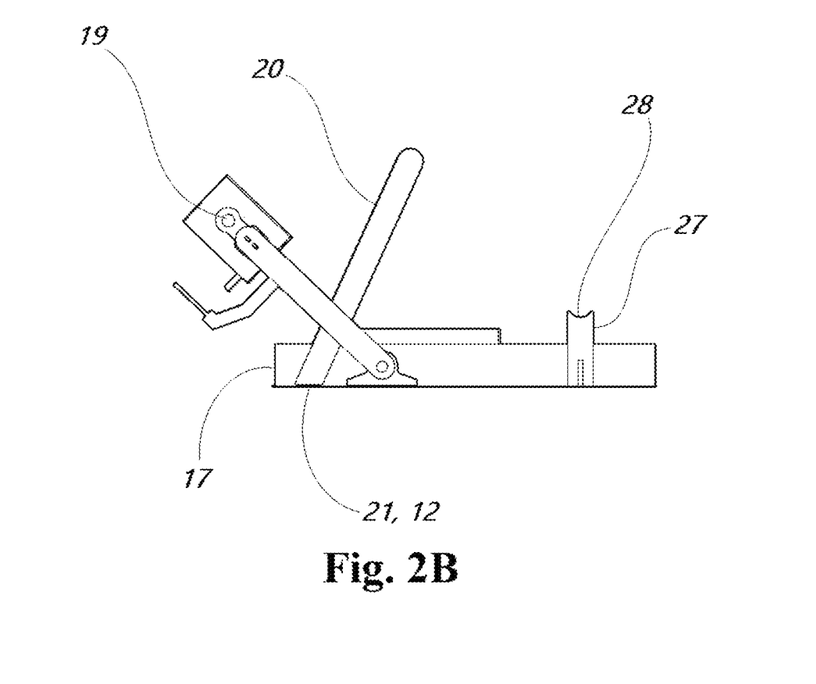
FIG. 2B shows the end view of the embodiment of the barbeque rotisserie assembly seen in FIG. 1 with the rotisserie axis in an extended position.

FIG. 2B shows the end view of the embodiment of the barbeque rotisserie assembly seen in FIG. 1 with the rotisserie axis in an extended position. The two slats pivot together and the axis of the rotisserie [19] is now extended beyond the edge of the floor frame [17.] The second slat [20] has its foot [21] on the floor or the surface of the generally planar base [12.] With the slat out of the way, this view now shows the vertical strut [27] which is affixed to or may be a part of the base, and which has a receiving site [28] for receiving the transverse strut [25 of FIG. 1.]

Figure 3:
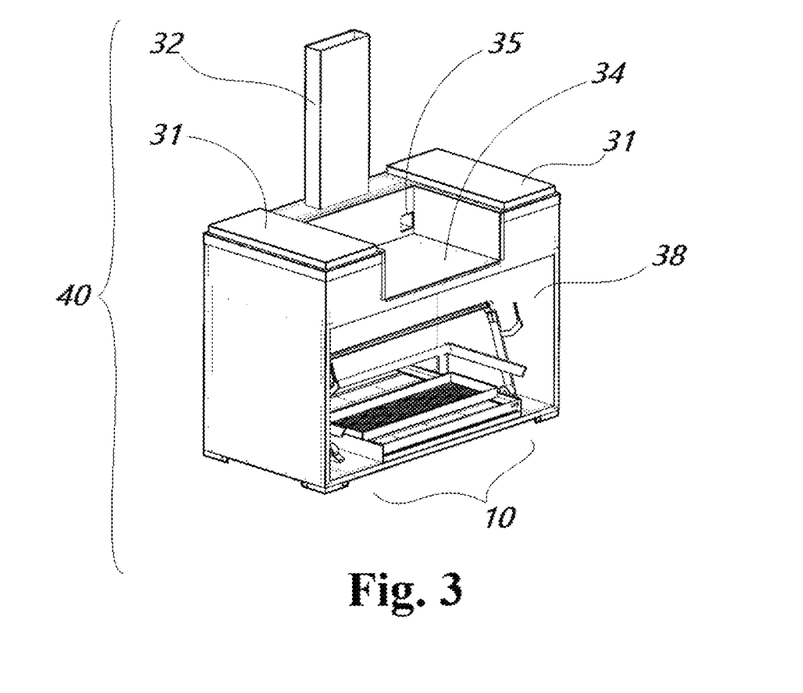
FIG. 3 shows an embodiment of a modular oven in accordance with the invention, including a rotisserie assembly.

FIG. 3 shows an embodiment of a modular barbeque appliance [40] in accordance with the invention and which includes a rotisserie assembly [10] installed inside an oven chamber which defines a cooking volume [38.] A chimney [32] contains a flue which communicates with the oven chamber. In this embodiment, the internal frame construction of the appliance supports two modular storage bins which are equipped with lids [31.] The frame and structure also include a recess or aperture [34] sized to receive a modular barbeque grill unit. Modular elements of the framework may incorporate receiving sites [35] with locating and restraining features and other attachments complementary to fixtures found on commercially available barbeque grills, such as standardized mounting flanges and plumbing for propane gas.

Figure 4:
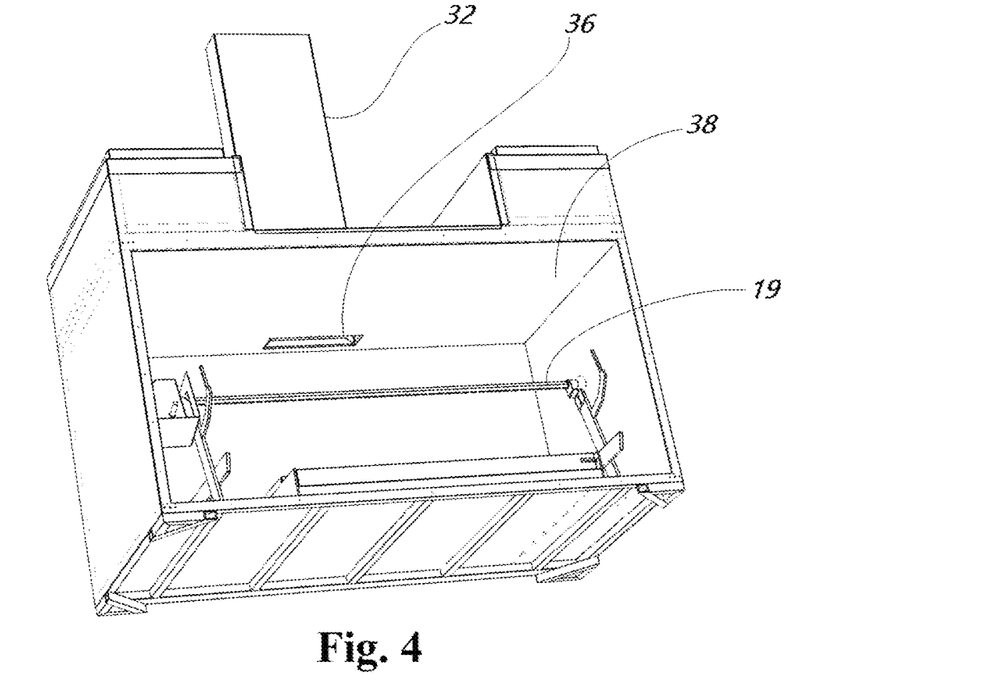
FIG. 4 shows an alternate view of the embodiment of a modular oven in accordance with the invention seen in FIG. 3.

FIG. 4 shows an alternate view of the embodiment of a modular oven in accordance with the invention seen in FIG. 3. The barbeque appliance is rotated in space to show part of the inside of the cooking space from below. The underside tubular framing of this embodiment is also seen in this view. The chimney [32] is seen, and the flue entrance [36] can be seen inside the cooking volume [38.] The rotisserie spit [19] is shown seated in its attachment or connection points on the two end frames.

FIG. 5 shows an extendable rotisserie assembly in accordance with the invention and having a diagonal brace. The rotisserie assembly pivots on two pillow blocks [15] mounted coaxially. In this embodiment each end frame further comprises a first attachment point [45,] a second attachment point [46,] and a third attachment point [47.] The rotisserie spit [19] is shown seated in its attachment or connection points on the two end frames, with at least a portion of the rotisserie spit extending between the two end frames. The two end frames comprise slats [20] joined to each other, and they are connected by a transverse strut [25.] A diagonal brace [41] adds torsional rigidity to the entire assembly, so that a user with one occupied hand may extend or retract the rotisserie using just the other free hand grasping only one handle.

If the end frame on the right side of the figure is called a first frame and the end frame on the left side of the figure is called the second frame, then the diagonal brace as shown in this figure extends between the end frames and is affixed to the second attachment site of the first end frame and the third attachment site of the second end frame.

Alternative stiffening arrangements also exist within the scope of the invention, such as having the diagonal brace extending between and affixed to a point adjacent to the second attachment site of the first end frame and the third attachment site of second end frame, or having the diagonal brace extending between and affixed to the second attachment site of the first end frame and a point adjacent to the third attachment site of the second end frame. Also residing within the scope of the invention is an arrangement with the diagonal brace extending between and affixed to a point adjacent to the second attachment site of the first end frame and a point adjacent to the third attachment site of the second end frame.

Figure 6A:
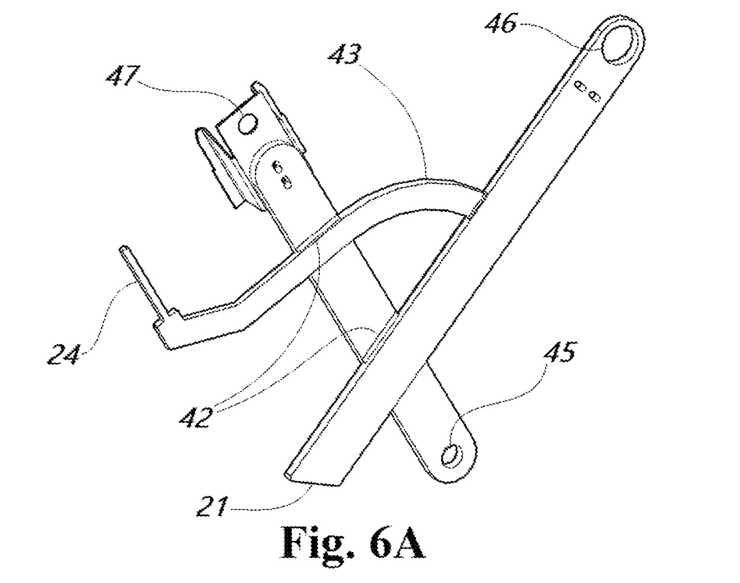
FIG. 6A shows an alternative embodiment of an end frame for a rotisserie assembly in accordance with the invention.

FIG. 6A shows an alternative embodiment of an end frame for a rotisserie assembly in accordance with the invention. The frame is built up of slats, two of which are straight and joined together in saltire, and a third slat [43] comprises a handle [24] and is joined to the other two slats. This end frame includes a first attachment point [45,] a second attachment point [46,] and a third attachment point [47.] One of the slats terminates with a foot [21.] In this embodiment the slats are joined together by weldments [42.]

Figure 6B:
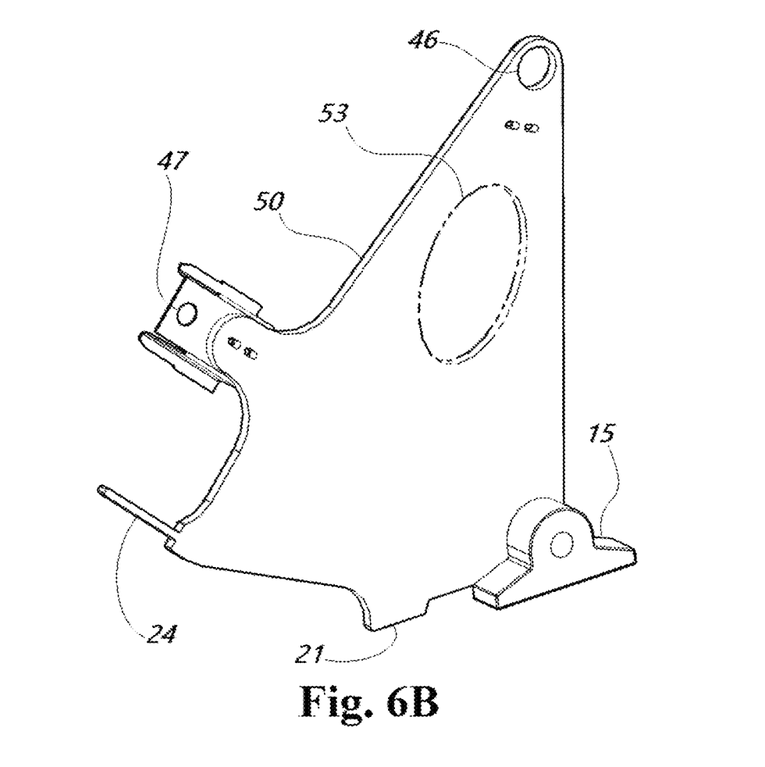
FIG. 6B shows an alternative embodiment of an end frame for a rotisserie assembly in accordance with the invention which is an end plate.

FIG. 6B shows an alternative embodiment of an end frame for a rotisserie assembly in accordance with the invention which is an end plate. The plate [50] includes features such as a foot [21] and a handle [24,] and first attachment point, a second attachment point [46,] and a third attachment point [47] having a bracket adapted to receive and retain the rotisserie spit. A pillow block [15] attaches to the first attachment point and constrains this end frame to rotation about its axis. The end plate may optionally include one or more cutouts [53] of arbitrary or dedicated shapes for lightness, ornamentality, or to advantageously locate a center of gravity of an end frame or a center of gravity of the rotisserie assembly in a loaded or unloaded condition so that the assembly can be more easily pivoted between an extended and a retracted position.

Figure 7:
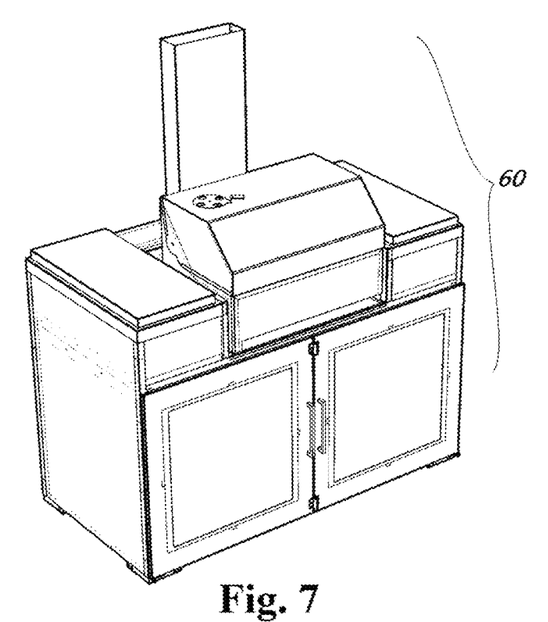
FIG. 7 shows an embodiment of a modular barbeque appliance in accordance with the invention with a modular barbeque unit installed in a dedicated aperture therefor.

FIG. 7 shows an embodiment of a modular barbeque appliance [60] in accordance with the invention with a modular barbeque unit installed in a dedicated aperture.

Figure 8:
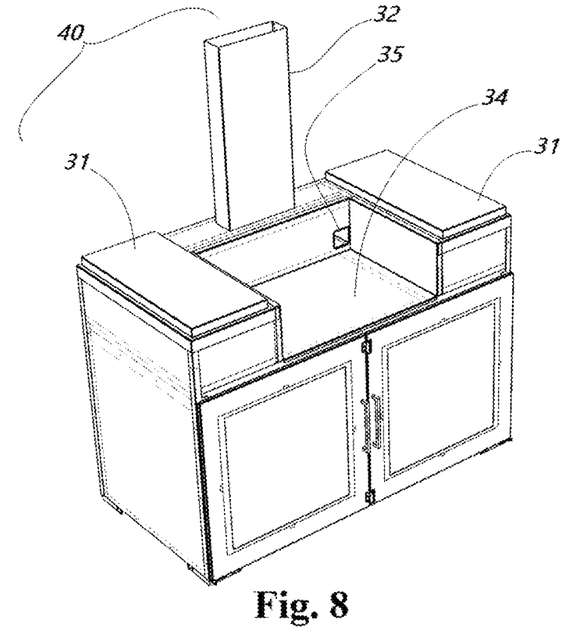
FIG. 8 shows the embodiment of the modular barbeque appliance of FIG. 7, with the modular barbeque unit omitted to reveal features of the dedicated aperture.

FIG. 8 shows the embodiment of a modular barbeque appliance [40] of FIG. 7 but with the modular barbeque unit omitted to reveal features of the dedicated aperture [34] which is a recess complementary to and designed to receive a modular barbeque grill unit. Modular elements of the framework may incorporate receiving sites [35] with locating and restraining features and other attachments complementary to fixtures found on commercially available barbeque grills, such as standardized mounting flanges and plumbing for propane gas. Thus the receiving site may further comprise a plumbing fixture for delivering combustible gas.

The appliance includes at least one food preparation surface which may be permanently installed or may be incorporated into a lid [31] of a storage bin or a storage module. Within the doors beneath the grille aperture there is an oven chamber which defines a cooking volume and having a refractory material deposited therein. The appliance also includes a chimney [32] having a flue communicating with the oven chamber, and an extendable rotisserie assembly comprising a rotatable spit having an axis of rotation extendable outside of the cooking volume. A modular storage unit may also be disposed between the food preparation surface and said oven chamber.

According to other alternative embodiments within the scope of the invention, thermal insulation may be included to shield at least a portion of the oven chamber so that heat can be contained for fuel efficiency and so that heat will not spread or be conducted to other areas of the appliance where it is undesirable, such as near insulated electrical wiring or combustible gas plumbing, or to food storage modules which are intended to be kept cool or at ambient rather than warmed or pre-heated temperatures.

Thermal insulation may also be disposed between a food preparation surface and the oven chamber to prevent a food preparation surface from becoming undesirably heated and cooking or altering the consistency of the food while it is being prepared on the surface. Thermal insulation material may comprise gypsum, such as sheetrock slabs.

Figure 9:
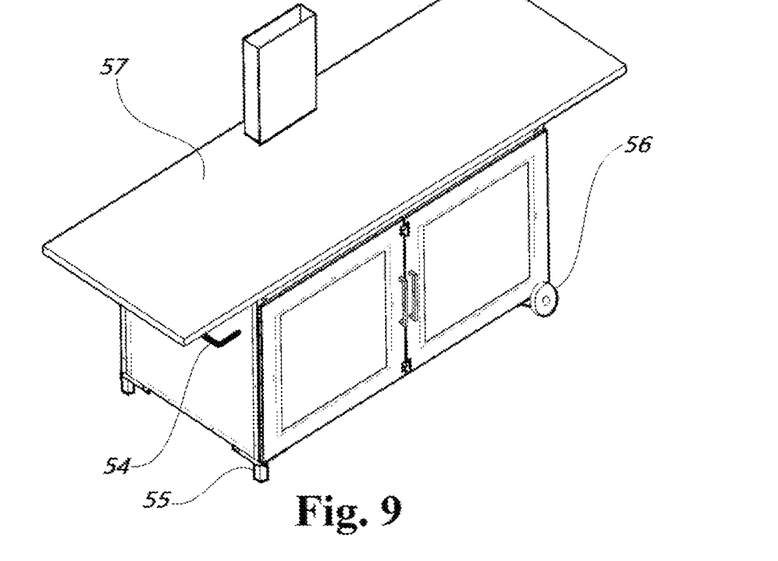
FIG. 9 shows an embodiment of a modular barbeque appliance in accordance with the invention which is moveable and has a chimney and flue which passes through a countertop.

FIG. 9 shows an embodiment of a modular barbeque appliance in accordance with the invention is moveable and has a chimney and flue which passes through a countertop [57.] This embodiment includes frame feet [55,] a lifting handle [54] and wheels [56] so that the entire appliance may be relocated as desired.

Figure 10:
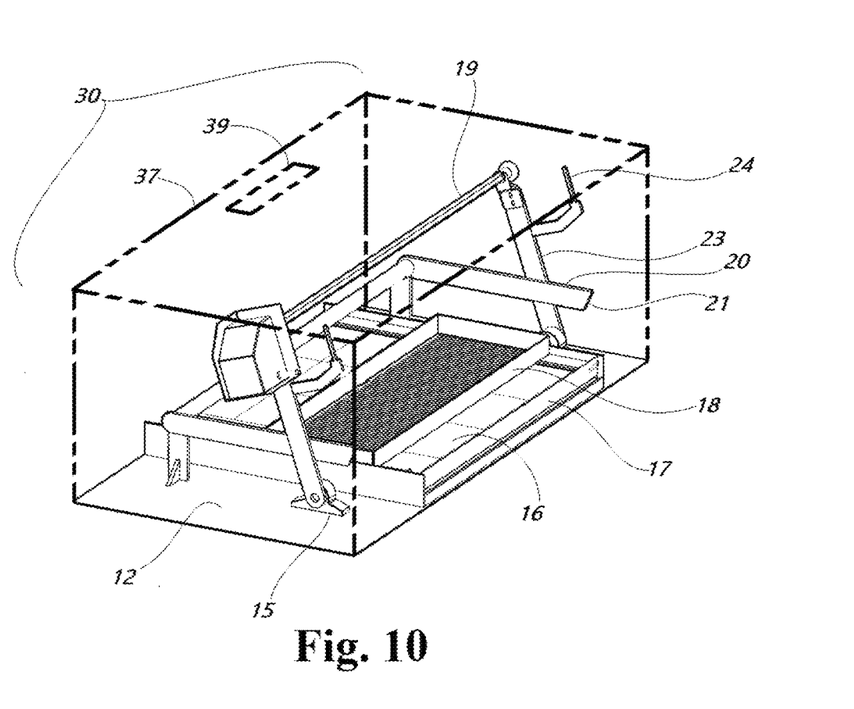
FIG. 10 shows a cooking volume in accordance with the invention including an extendable rotisserie assembly.

FIG. 10 shows an embodiment of an oven [30] in accordance with the invention having a cooking volume [37] including an extendable rotisserie assembly. Combustion exhaust leaves the cooking volume through a flue exit [39.] A rotatable spit [19] is detachable from the rotisserie assembly.

Figure 11:
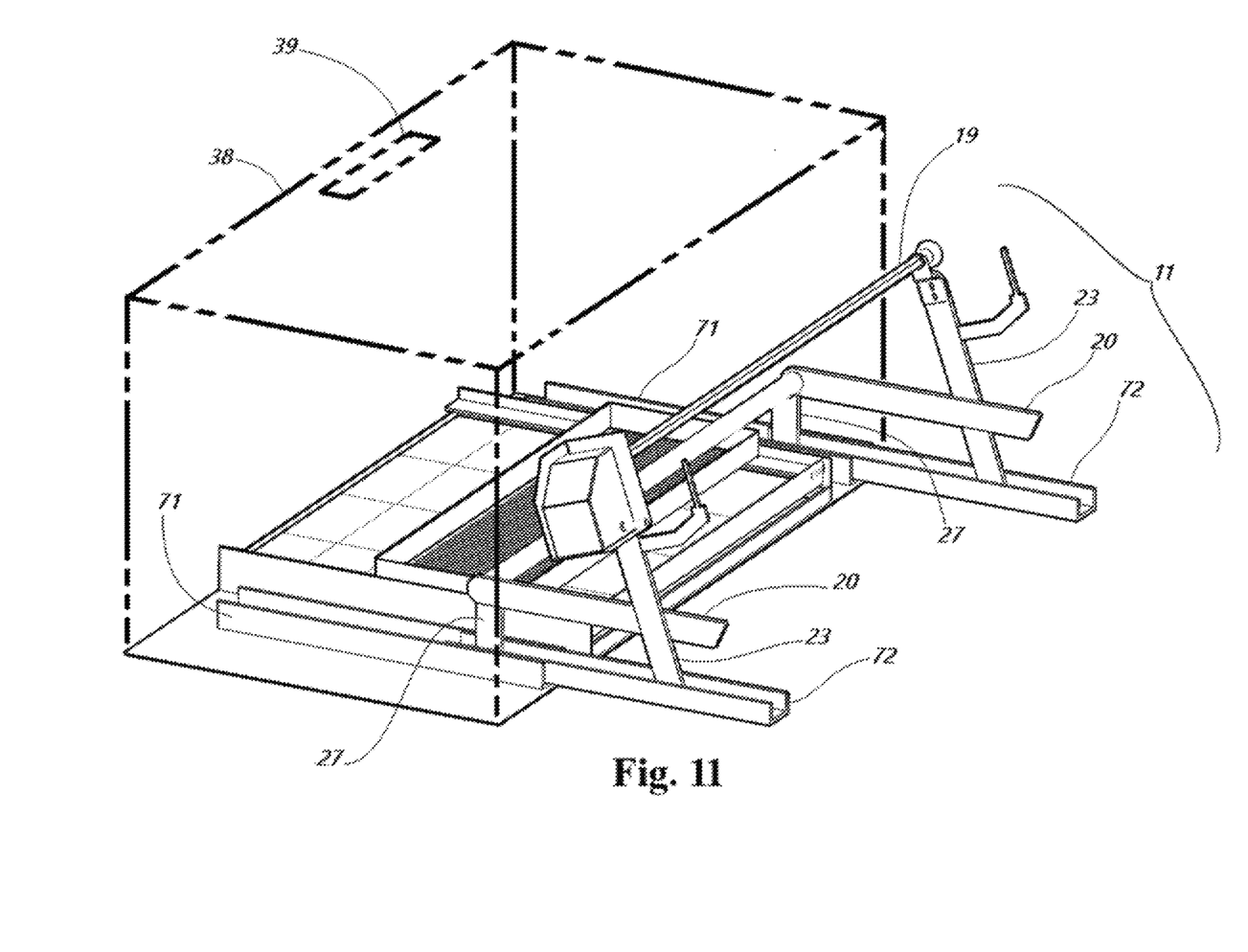
FIG. 11 shows a cooking volume including an alternative embodiment of an extendable rotisserie assembly in accordance with the invention which translates the rotisserie spit axis of rotation along guides.

FIG. 11 shows a cooking volume [38] including an alternative embodiment of an extendable rotisserie assembly [11] in accordance with the invention which translates the rotisserie spit [19] axis of rotation along tracks or guides comprising slidable members in contact with or slidably coupled to guide bars. Combustion exhaust leaves the cooking volume through a flue exit [39.]

The extendable rotisserie assembly includes two end frames, each having a handle which may be attached to or formed as a portion extending from a first slat [23,] and the end of a second slat [20] extending to a foot. According to one embodiment the frames may pivot the entire assembly as described previously, or alternatively the foot may be immovably affixed to a slidable member [72.] The two end frames are connected by at least one transverse beam which rests upon at least one vertical strut [27.]

The sliding members of each frame of the extendable rotisserie assembly slidably reside in contact with guide bars [71.] Pulling on the rotisserie assembly translates the axis of rotation of the rotisserie spit [19] so that it may be extended outside of the cooking volume for easy access for loading or unloading foods for barbequing, which may include removing and installing a detachable and replaceable rotisserie spit.

Another way to describe this embodiment is that the modular oven defines a cooking volume having an exit flue and within which is disposed a rotisserie assembly that includes, among other features and components, a rotatable spit having first and second ends and two end frames each comprising first and second attachment points. The end frames each have a handle for pivoting or sliding the extendable rotisserie assembly in and out of the cooking volume. The first attachment points of each end frame attach to a slidable member. A transverse strut extends between both end frames, and the spit can be both rotatably and detachably coupled to and removed from the second attachment points of both end frames. At least a portion of the rotisserie spit extends between the end frames, although the spit may also extend beyond either or both end frames. Each end frame includes or is attached to a slidable member which slides along or within a guide bar such as a track, a rail, a C-channel, a U-channel, or an angle channel. The translatable, extendable rotisserie assembly may also be mounted on wheels which interoperate with fixed tracks or rails within the cooking volume.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An extendable rotisserie assembly comprising
  a rotatable spit having first and second ends, two end frames each comprising first, second, and third attachment points, a foot, and a handle,
  a generally planar base including at least two rotational couplings oriented to define an axis of rotation, with first attachment points of each end frame attached to said couplings for coaxial rotation about said axis of rotation,
  a transverse strut extending between and attached to said second attachment points of both end frames, said spit rotatably coupled to said third attachment points of both said end frames,
  with at least a portion of said rotisserie spit extending between said end frames,
  said base further comprising at least one vertical strut having a receiving site for receiving said transverse strut, and
  a motor operably coupled to said rotatable spit.

2. The extendable rotisserie assembly of claim 1, further comprising a diagonal brace extending between and affixed to said second attachment site of said first end frame and attached to said third attachment site of said second end frame.

3. The extendable rotisserie assembly of claim 1, further comprising a diagonal brace extending between and affixed to a point adjacent to said second attachment site of said first end frame and attached to said third attachment site of said second end frame.

4. The extendable rotisserie assembly of claim 1, further comprising a diagonal brace extending between and attached to said second attachment site of said first end frame and affixed to point adjacent to said third attachment site of said second end frame.

5. The extendable rotisserie assembly of claim 1, further comprising a diagonal brace extending between and affixed to a point adjacent to said second attachment site of said first end frame and affixed to a point adjacent to said third attachment site of said second end frame.

6. The extendable rotisserie assembly of claim 1, wherein an end frame comprises two slats joined in saltire.

7. The extendable rotisserie assembly of claim 6, wherein at said handle further comprises a helical coil.

8. The extendable rotisserie assembly of claim 1, wherein said rotisserie spit is a detachable rotisserie spit, and at least one of said end frames further comprises a bracket adapted to receive and retain said detachable rotisserie spit.

9. The extendable rotisserie assembly of claim 1, wherein at least one of said two rotational couplings is a pillow block.

10. The extendable rotisserie assembly of claim 1, wherein said end frames are each affixed to slidable members.

11. The extendable rotisserie assembly of claim 1, wherein said slidable members reside in contact with guide bars.

12. A modular oven defining a cooking volume, within which is disposed a rotisserie assembly further comprising:
  a rotatable spit having first and second ends,
  two end frames each comprising first and second attachment points and a handle, with first attachment points of each end frame attached to a slidable member slidably coupled to a guide bar,
  a transverse strut extending between both said end frames,
  said spit rotatably and detachably coupled to said second attachment points of both said end frames, with at least a portion of said rotisserie spit extending between both said end frames,
  and with said cooking volume further comprising an exit flue.

13. The modular oven of claim 12, wherein said extendable rotisserie assembly further comprises a motor operably coupled to said rotatable spit.

14. The modular oven of claim 12, wherein said extendable rotisserie assembly further comprises a diagonal brace extending between and attached to a point adjacent to said second attachment site of said first end frame and attached to said third attachment site of said second end frame.

15. The modular oven of claim 12, wherein said extendable rotisserie assembly further comprises a diagonal brace extending between and attached to a point adjacent to said second attachment site of said first end frame and attached to said third attachment site of said second end frame.

16. The modular oven of claim 12, wherein said extendable rotisserie assembly further comprises a diagonal brace extending between and attached to said second attachment site of said first end frame and affixed to a point adjacent to said third attachment site of said second end frame.

17. The modular oven of claim 12, wherein said extendable rotisserie assembly further comprises a diagonal brace extending between and affixed to a point adjacent to said second attachment site of said first end frame and a affixed to a point adjacent to said third attachment site of said second end frame.

18. The modular oven of claim 12, wherein said rotatable spit of said extendable rotisserie assembly is detachable from said rotisserie assembly.

* * * * *

UNITED STATES PATENT AND TRADEMARK OFFICE
CERTIFICATE OF CORRECTION

| | |
|---|---|
| PATENT NO. | : 11,272,808 B2 |
| APPLICATION NO. | : 16/734315 |
| DATED | : March 15, 2022 |
| INVENTOR(S) | : Marko Moric |

It is certified that error appears in the above-identified patent and that said Letters Patent is hereby corrected as shown below:

On the Title Page

Item (12), should read: Moric

Item (72), should read: Marko Moric, Phoenix, AZ (US)

Signed and Sealed this
Sixteenth Day of May, 2023

*Katherine Kelly Vidal*

Katherine Kelly Vidal
*Director of the United States Patent and Trademark Office*